United States Patent
Hayami

[11] 3,945,026
[45] Mar. 16, 1976

[54] FOCAL PLANE SHUTTER

[75] Inventor: Tadao Hayami, Tokyo, Japan

[73] Assignee: Kabushiki Kaisha Koparu, Tokyo, Japan

[22] Filed: Feb. 13, 1974

[21] Appl. No.: 441,986

Related U.S. Application Data

[62] Division of Ser. No. 294,547, Oct. 3, 1972, Pat. No. 3,825,940.

[30] Foreign Application Priority Data
Oct. 6, 1971  Japan.................. 46-78455

[52] U.S. Cl. ............... 354/147; 354/137; 354/138; 354/146; 354/239; 354/260
[51] Int. Cl.² ........................................ G03B 15/04
[58] Field of Search ............ 354/146, 147, 260, 34, 354/137, 138, 239

[56] References Cited
UNITED STATES PATENTS

| | | | |
|---|---|---|---|
| 2,930,298 | 3/1960 | Suzukawa ..................... | 354/146 |
| 3,825,940 | 7/1974 | Hayami ........................ | 354/260 |
| 3,852,778 | 12/1974 | Ivva ............................ | 354/239 |

*Primary Examiner*—L. T. Hix
*Assistant Examiner*—Russell E. Adams, Jr.
*Attorney, Agent, or Firm*—Cushman, Darby & Cushman

[57] ABSTRACT

A flash synchronizing device suitable for focal plane shutters arranged to accurately synchronize lighting of the flash bulb and opening of the shutter and comprising an M-movable contact to be moved for closing the flash circuit at the same time as shutter releasing, a release lock lever to be moved at the same time as shutter releasing in order to open the shutter, and a gear governor which operates to delay the shutter opening time as the shutter speed becomes higher by retarding the motion of said release lock lever.

1 Claim, 5 Drawing Figures

FOCAL PLANE SHUTTER

This is a division of application Ser. No. 294,547 filed Oct. 3, 1972, now U.S. Pat. No. 3,825,940 issued July 23, 1974.

BACKGROUND OF THE INVENTION a. Field of the invention

The present invention relates to a focal plane shutter and, more particularly, to a flash synchronizing device pertaining to said type of shutter for accurately synchronizing lighting of the flash bulb and opening of the shutter.

b. Description of the prior art

For focal plane shutters, it is generally required, in order to synchronize lighting of the flash bulb and opening of the shutter, to change the time lag between the instant of closing of the flash circuit and instant of starting of the shutter opening motion in proportion to the shutter speed by taking the lighting characteristic of the flash bulb to be used into consideration. To satisfy the above requirement, the known focal plane shutters are arranged as follows. That is, a pair of switch levers which are actuated by a cam or pin is provided for closing the flash circuit and the mutual distance of said pair of switch levers is changed according to the shutter speed to be set. Alternately, a C-R delay circuit is provided for closing the flash circuit and the time constant of said delay circuit is changed according to the shutter speed. Said known types of focal plane shutters, however, have disadvantages as described below. That is, it is impossible to obtain the accurate time lag suitable for the set shutter speed, operation is unstable, or the device itself becomes comparatively complicated.

SUMMARY OF THE INVENTION

It is, therefore, the principal object of the present invention to provide a flash synchronizing device for focal plane shutters comprising a switch device for closing the flash circuit at the same time as the shutter is released and a mechanical delaying device for delaying the time from the instant of shutter releasing to the instant of starting of the shutter opening motion and arranged to change the operating time of said mechanical delaying device according to the shutter speed in order to eliminate said disadvantages.

Another object of the present invention is to provide a flash synchronizing device for focal plane shutters especially suitable for using flash bulbs of the M-class.

DESCRIPTION OF THE PREFERRED EMBODIMENT

Figure 1:
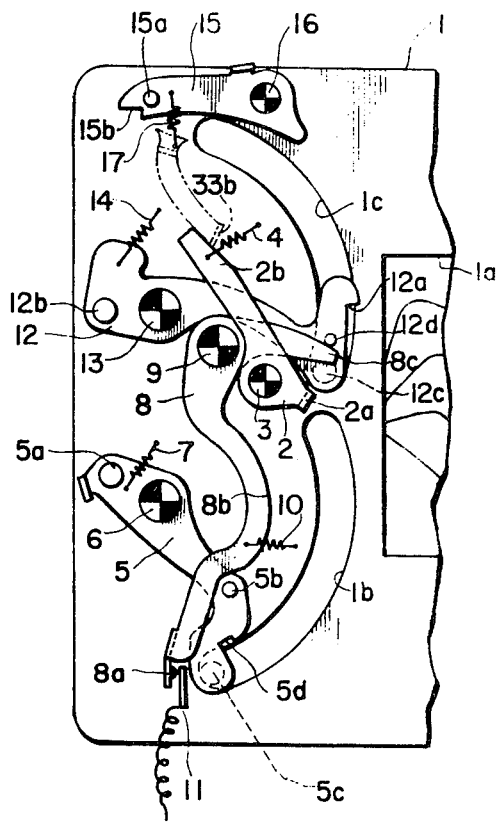
FIG. 1 is a fragmentary front elevational view showing the shutter blade actuating mechanism of an embodiment of the focal plane shutter according to the present invention.

Referring now to FIG. 1, reference numeral 1 designates a base plate having an exposure aperture 1a and arcuate slots 1b and 1c. Numeral 2 designates an opening release lever pivoted by a shaft 3 to the base plate 1 and biased by a spring 4 to the clockwise direction. The opening release lever 2 has a bent portion 2a and an arm portion 2b. Numeral 5 designates an opening actuating member pivoted by a shaft 6 to the base plate 1 and biased by a spring 7 to the clockwise direction. The opening actuating member 5 has pins 5a and 5b, a pin 5c penetrating the base plate 1 through the slot 1b therein to the back thereof, and a hook portion 5d adapted to engage with the bent portion 2a. Numeral 8 designates an X-contact lever pivoted by a shaft 9 to the base plate 1 and biased by a spring 10 to the counter-clockwise direction. The X-contact lever 8 has a contact 8a, a cam portion 8b co-operating the pin 5b and an arm portion 8c co-operating a pin 12d to be described later. The contact 8a can be brought into electric contact with a fixed contact 11. Numeral 12 designates a closing actuating member pivoted by a shaft 13 to the base plate 1 and biased by a spring 14 to the clockwise direction. The closing actuating member 12 has a hook portion 12a, a pin 12b, a pin 12c penetrating the base plate 1 through the slot 1c therein to the back thereof and the abovementioned pin 12d. Numeral 15 is a closing release lever pivoted by a shaft 16 to the base plate 1 and biased by a spring 17 to the counter-clockwise direction. The closing release lever 15 has a pin 15a and a hook portion 15b adapted to engage with the hook portion 12a.

Figure 2:
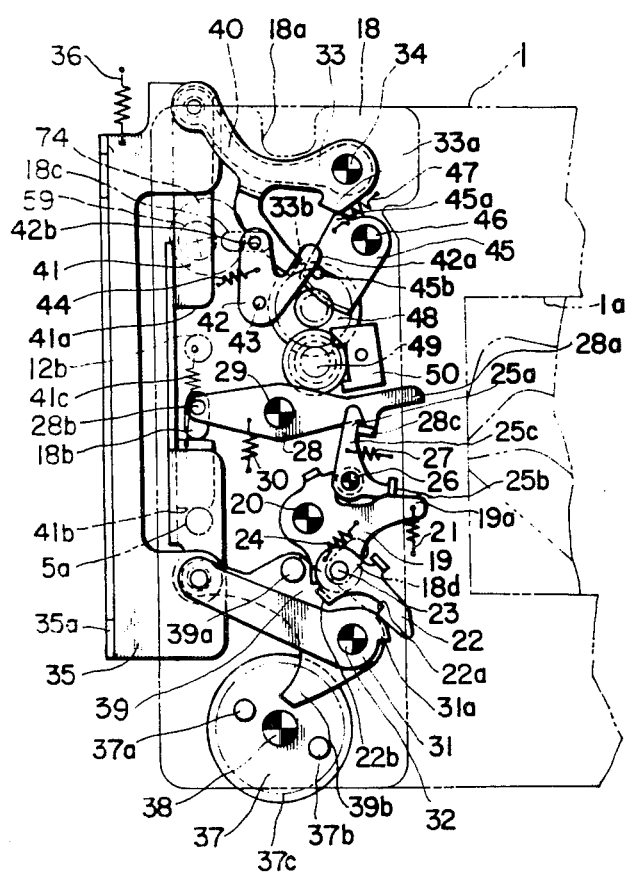
FIG. 2 is a fragmentary elevational view showing shutter charge and release mechanisms of the same embodiment including the flash synchronizing device according to the present invention.

Referring to FIG. 2, reference numeral 18 designates a plate secured to the base plate 1 and held at a suitable distance therefrom. The plate 18 is formed with a recess 18a and slots 18b, 18c and 18d. The parts shown in FIG. 2 are all provided on the back side of the plate 18. Numeral 19 designates a main release lever pivoted by a shaft 20 to the plate 18 and biased by a spring 21 to the clockwise direction. The main release lever 19 has an arm 19a. Numeral 22 designates a hook lever pivoted to the main release lever 19 a shaft 23 penetrating the plate 18 through the slot 18d therein to the front side thereof. The hook lever 22 is biased by a spring 24 to the clockwise direction, and it has a hook portion 22a and a bent portion 22b engaged with the lever 19. Numeral 25 designates an M-contact release lever pivoted by a shaft 26 to the plate 18 and biased by a spring 27 to the clockwise direction. The M-contact release lever 25 has a hook portion 25a and a bent portion 25b engaged with the arm 19a. Numeral 28 designates an M-contact actuating lever pivoted by a pin 29 to the plate 18 and biased by spring 30 in the counter-clockwise direction. The M-contact actuating lever 28 has an arm 28a, a pin 28b penetrating the plate 18 through the slot 18b therein to the front side thereof and a bent portion 28c adapted to engage with the hook portion 25a. Numeral 31 designates a release actuating lever pivoted by a shaft 32 to the plate 18 and has a stepped portion 31a adapted to engage with the hook portion 22a. Numeral 33 designates a release lock lever pivoted by a shaft 34 to the plate 18 and having a bent portion 33b adapted to engage with the arm 2b of the opening release lever 2 as shown in FIG. 1. Numeral 35 designates a release interlocking plate pivotally linked to the levers 31 and 33 for pantagraph movement and biased by a spring 36 in the upper direction. The release interlocking plate 35 has a bent portion 35a formed with notches 35b and 35c. Numeral 37 designates a gear mounted on a shaft 38 and having pins 37a and 37b and a gear portion 37c meshing with a winding mechanism not shown of the camera. The gear 37 can be rotated for one half rotation to the clockwise direction by operating the winding mechanism. Numeral 39 designates a charge lever pivoted by a shaft 32 to the plate 18 and having a pin 39a adapted to engage with the lever 31 and an arm 39b adapted to engage with the pins 37a and 37b. Numeral 40 designates an additional charge lever pivoted by a shaft 34 to the plate 18. Numeral 41 designates a charge link member pivotally linked to the levers 39 and 40 for pantagraph movement and having bent portions 41a and 41b adapted to engage with and push the pins 12b and 5a of the respective closing and opening actuating member 12 and 5. Numeral 42 designates a synchro-lever pivoted by a shaft 43 to the plate 18 and biased by a spring 44 to the counter-clockwise direction. The synchro-lever 42 has an arm 42a and a pin 42b penetrating the plate 18 through the slot 18c therein to the front side thereof. Numeral 45 designates an M-synchro-sector gear pivoted by a shaft 46 to the plate 18 and biased by a spring 47 to the clockwise direction. It has a projection 45a and a pin 45b, and the extent of its clockwise movement is controlled by the arm 42a engaging with the projection 45a. Gears 48 and 49 and an anchor 50 co-operate with the M-synchro-sector gear 45 and constitute therewith an M-synchro-governor.

Figure 3:
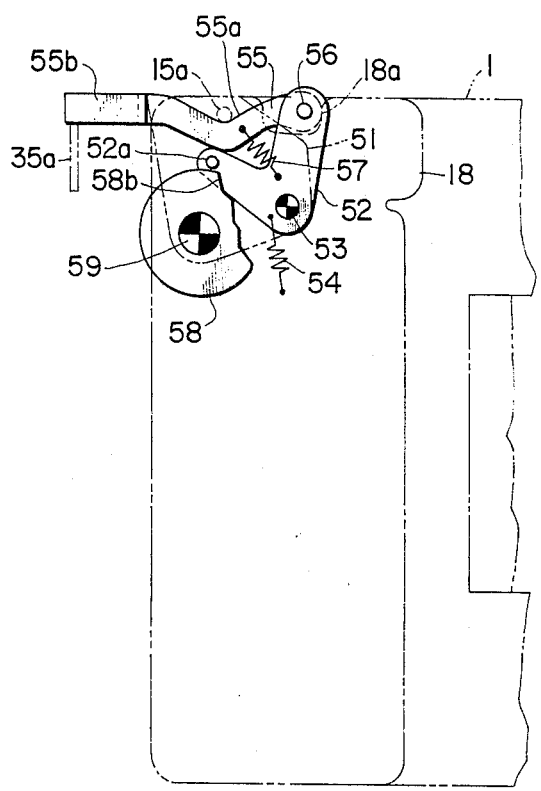
FIG. 3 is a fragmentary elevational view showing a release timing control mechanism for the closing shutter blades used for the control of the high-speed exposure time.

Referring to FIG. 3, reference numeral 51 designates a plate secured to the plate 18 on the upper side thereof in the drawing and at a suitable distance therefrom. Numeral 52 designates a closing control lever pivoted by a shaft 53 to the plate 51 on the back side thereof and biased by a spring 54 to the counter-clockwise direction. Numeral 55 designates a closing release actuating lever pivoted to the lever 52 by a shaft 56 extending across the recess 18a of the plate 18 such that is located on the back side of the plate 18. The closing release actuating lever 55 has a cam portion 55a engaging with the pin 15a of the closing release lever 15 shown in FIG. 1 and an arm portion 55b adapted to engage with the top of the bent portion 35a of the release interlocking plate 35 shown in FIG. 2. Numeral 58 designates a high-speed control cam pivoted by a shaft 59 to the plate 51 on the back side thereof and having a pin 58a and a cam portion 58b receiving the pin 52 a.

Figure 4:
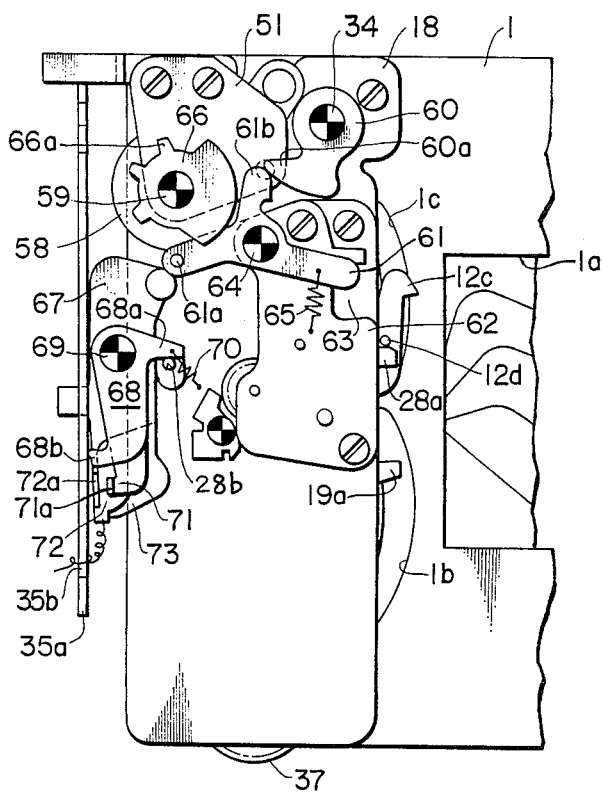
FIG. 4 is a fragmentary elevational view showing the whole shutter control mechanism including the synchro-contact means according to the present invention.

Referring to FIG. 4, reference numeral 60 designates a low-speed control lever rotatably mounted on a shaft 34. The low-speed control lever 60 is integral with the release lock lever 33 shown in FIG. 2 and biased by a spring 36 to the clockwise direction, and it has an arm 60a. Numeral 61 designates an interlocking lever co-operating with a sector gear of the well-known gear governer interposed between upper and lower plates 62 and 63 both secured on the plate 18. The interlocking lever 61 is pivoted by a shaft 64 to the upper plate 62 and biased by a spring 65 to the clockwise direction, and it has a pin 61a and an arm 61b adapted to engage with the arm 60a. Numeral 66 designates a low-speed control cam rotatably mounted on the shaft 59 to control the extent of the clockwise movement of the interlocking lever 61 by receiving the pin 61a. The low-speed control cam 66 is integral with the high-speed control cam 58 shown in FIG. 3. Numeral 68 designates a movable M-contact lever pivoted by a shaft 69 to the plate 67 secured to the plate 18 and held at a suitable distance therefrom. The movable M-contact lever is biased by a spring 70 to the clockwise direction. The movable M-contact lever 68 has an arm 68a adapted to engage with the pin 28b of the M-contact operating lever 28 to thereby restrict its clockwise rotation and an arm 68b adapted to engage with the bent portion 35a of the release interlocking plate 35 shown in FIG. 2 and penetrate the notch 35b. The movable M-contact lever 68 is constructed integrally with an M-movable contact 71 having a bent portion 71a. Numeral 72 designates an M-stationary contact secured to the plate 67 and electrically insulated therefrom through an insulating sheet 73. The M-stationary contact 72 has a bent portion 72a adapted to engage with the bent portion 71a.

The operation of the embodiment described above according to the present invention will now be described. The parts shown in FIGS. 1 to 5 are all in their stationary states. The cocking of the shutter from this state will first be described.

The cocking operation of the shutter is effected by turning the gear 37, shown in FIGS. 2 or 4, 180° to the clockwise direction. Referring to FIG. 2, with the clockwise rotation of the gear 37 the pin 37a thereof strikes and pushes the arm 39b of the charge lever 39 to cause counter-clockwise rotation thereof, and then it detaches from the arm 39b and reaches the position of the pin 37b to end the shutter cocking operation. As the charge lever 39 is rotated counter-clockwise, its pin 39a pushes the release actuating lever 31 to cause counter-clockwise rotation thereof. As a result, the lever 31 lowers the release interlocking plate 35 to cause counter-clockwise rotation of the release lock lever 33. At the end of the counter-clockwise rotation of the lever 31, the stepped portion 31a thereof engages with the hook portion 22a of the hook lever 22, whereby the lever 31 is locked against its clockwise rotation by the force of the spring 36. Meanwhile, as the release lock lever 33 is rotated counter-clockwise, its bent portion 33b swings to the right, causing the clockwise rotation of the arm 2b of the opening release lever 2 shown in FIG. 1. Further, as the release interlocking plate 35 is lowered, the movement of its bent portion 35a is followed by the arm 55b of the closing release actuating lever 55 biased to the counter-clockwise direction in FIG. 3, thus causing the clockwise rotation of the lever 55, whose movement is in turn followed by the pin 15a of the closing release lever 15 shown in FIG. 1 to cause counter-clockwise rotation thereof. By such rotation of the levers 2 and 15 the charge lock preparation for the opening and closing actuating members 5 and 12 to be described next is ended.

Figure 5:
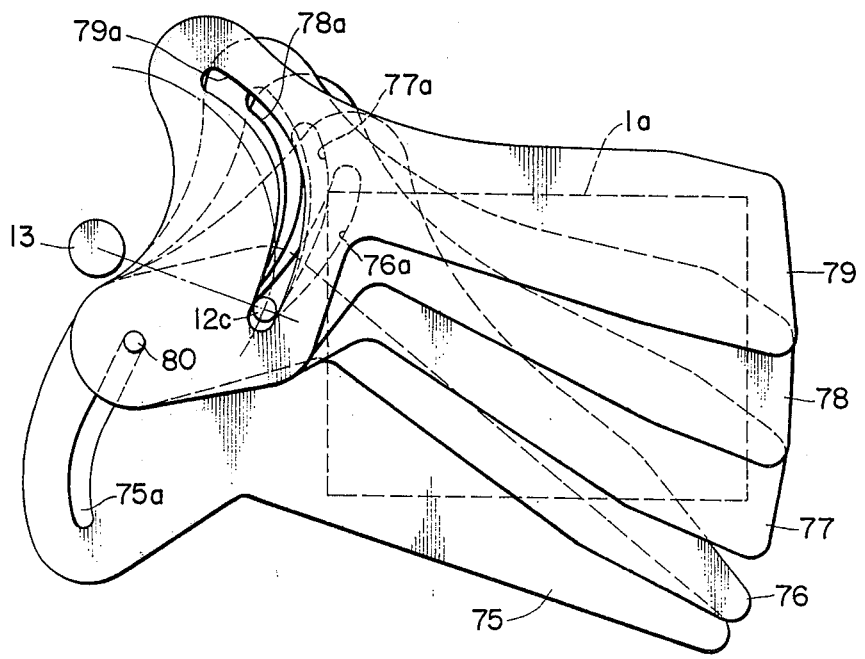
FIG. 5 is an elevational view showing only the closing shutter blades.

As the charge lever 39 shown in FIG. 2 is rotated counter-clockwise, it lowers the change link member 41, whereby the bent portion 41a and 41b thereof push pins 12b and 5b, respectively, causing counter-clockwise rotation of the opening and closing actuating members 5 and 12 shown in FIG. 1 so as to bring the hook portions 5d and 12a of the respective members 5 and 12 into engagement respectively with the bent portion 2a of the release lever 2 and the hook portion 15b of the release lever 15. As the member 5 is rotated counter-clockwise, its pin 5b pushes the cam 8b to prevent the counter-clockwise rotation of the X-contact lever 8 due to the escapement of the pin 12d accompanying the following counter-clockwise rotation of the closing actuating member 12, thereby preventing the contact 8a from being brought into contact with the stationary contact 11. During its downward movement, the charge link member 41 shown in FIG. 2 first pushes the pin 5a and then pushes the pin 12b, whereby the opening shutter blades can overlap the closing shutter blades sufficiently deeply in the course of the cocking, thus preventing leakage of light during the movement of the blades. With the rotation of the pin 12c about the pin 13, the closing shutter blades 89 to 93 shown in FIG. 5 are caused to overlap one another above the upper edge of the exposure aperture 1a. At this time, the exposure aperture 1a is already closed by previously actuated opening shutter blades not shown. As the release lock lever 33 shown in FIG. 2 is rotated counter-clockwise, the low-speed control lever 60 is also rotated counter-clockwise to cause clockwise rotation of the interlocking lever 61 by the force of the spring 65 until the pin 61a engages the cam 66a. While the cocking operation of the shutter is completed in the above manner, as the pin 37a of the gear 37 rotated to the clockwise direction is subsequently detached from the arm 39b as mentioned earlier, the charge link lever 39, additional charge lever 40, and charge link member 41 all are returned to their initial positions shown in FIG. 2 by a spring 41c.

The shutter release operation will now be described. It is effected by rotating the main release lever 19 shown in FIG. 2 to the counter-clockwise direction. As the lever 19 is rotated counter-clockwise, it causes the hook lever 22 to release the lock of the release actuating lever 31, thus causing the rising of the release interlocking plate 35 and also clockwise rotation of the release lock lever 33. As the lever 33 is rotated clockwise, its bent portion 33b pushes the arm 2b of the opening release lever 2 to cause counter-clockwise rotation thereof, thus releasing the lock of the opening actuating member 5 to cause clockwise rotation thereof. In this way, the opening shutter blades not shown having the same shape as the closing shutter blades 75 to 79 but vertically opposite thereto are opened by the pin 5c to open the exposure aperture 1a. As the release lock lever 33 shown in FIG. 2 is rotated clockwise, its projection 33a is brought into engagement with the projection 45a of the M-synchro-sector gear 45, so that the gear governer in co-operation with the gear 45 provides a delay time from the instant of release of the lever 31 till the instant of release of the lever 33. That is, a delay time is provided from the instant of shutter releasing till the instant of starting of the opening motion of the shutter. Also, as the lever 5 is rotated clockwise, its pin 5b is detaches from the cam 8b to release the X-contact lever 8 for the rotation thereof by the force of the spring 10, so that the contact 8a of the lever 8 is brought into contact with the stationary contact 11. Therefore, when a flash bulb of X-class and a power source are connected between the contact 8a and stationary contact 11, the flash bulb is energized and flashes at the same time as the shutter is released.

Further, with the counter-clockwise rotation of the main release lever 19 the M-contact release lever 25 is also rotated counter-clockwise to release the lock of the M-contact actuating lever 28, whereupon the pin 28b of the lever 28 is followed by the arm 68a of the movable M-contact lever 68 to cause clockwise rotation thereof, thus bringing the bent portion 71a of the M-movable contact 71 into contact with the bent portion 72a of the M-stationary contact 72. Therefore, when a flash bulb of M-class and a power source are connected between the M-movable contact 71 and M-stationary contact 72, said bulb is energized at the same time as the shutter is released and its light intensity reaches the maximum value after a predetermined time passes. The M and X contacts are closed every time when the shutter is released. However, by switching over the connection of the energizing circuit for the flash bulb according to the flash bulb to be used, it is possible to light only the flash bulb used at that time. The timing of the engagement of the lever 33 shown in FIG. 2 with the gear 45 is determined by the position of the projection 45a of the gear 45, which position is in turn determined as the position of the pin 42b of the synchro-lever 42 is controlled by a cam 74 integral with the high-speed control cam 58 shown in FIG. 3. Thus, the timing is set according to the exposure time. As it is evident from the above explanation, it is possible, when using a flash bulb of M-class, to always coincide the instant when its light intensity becomes the maximum value to the instant when the shutter is opened.

The exposure is ended in the following way.

In case of the low-speed exposure, that is, in case when the closing shutter blades begin to cover the exposure aperture 1a after the aperture has been completely opened by the opening shutter blades, the exposure time is controlled by reducing the speed of the rising of the release interlocking plate 35. In more detail, after the opening release lever 2 shown in FIG. 2 is actuated by the clockwise rotation of the release lock lever 33, the arm 60a of the low-speed control lever 60 shown in FIG. 4 and integral with the lever 33 is brought into engagemnt with the arm 61b of the interlocking lever 61, whose position is controlled by the previously set low-speed control cam 66. In this way, the speed of the clockwise rotation of the lever 60 is regulated by the gear governor coupled to the interlocking plate 61. By delaying the action of the leve 33 in the above manner, the rising of the interlocking plate 35 pivotally coupled to it is delayed to delay the timing of pushing the arm 55b of the closing release lever 55 shown in FIG. 3 with the top end of the bent portion 35a of the interlocking plate 35. With the clockwise rotation of the lever 55 caused in the above way the cam 55a thereof pushes the pin 15a of the closing release lever 15, causing clockwise rotation thereof to release the lock of the closing actuating member 12, whereby the closing shutter blades 75 to 79 held above the upper edge of the exposure aperture 1a in the overlapping form as mentioned earlier is rotated clockwise by the pin 12c back to their initial positions as shown in FIG. 5, thus ending the exposure. When said member 12 rotates clockwise, said member 12 pushes the arm 28a of the M-contact actuating lever 28, which is shown in FIG. 2, by the pin 12d thereof to rotate said lever 28 clockwise and makes the bent portion 28c of said lever 28 engage with the hook portion 25a of the M-contact release lever 25. By the above, the movable M-contact lever 68 shown in FIG. 4 is turned counter-clockwise as the arm 68a thereof is pushed by the pin 28b of said lever 28 and removes the bent portion 71a of the M-movable contact 71 from the M-stationary contact 72. At the same time, referring to FIG. 1, said pin 12d pushes the arm 8c of the X-contact lever 8 in the final stage of the clockwise rotation of said member 12 and removes the contact 8a from the fixed contact 11.

In case of the high-speed exposure, that is, in case when the exposure aperture 1a is always partly shut by the shutter blades from the start till the end of the exposure, even in such case as the closing shutter blades 75 to 79 shown in FIG. 5 appear within the exposure aperture 1a immediately when the opening shutter blades gets out of the exposure aperture, the speed of action of the interlocking plate 35 shown in FIG. 2 is restricted in no way is always constant. Here the exposure time is controlled by controlling the timing of the actuation of the closing release lever 15 shown in FIG. 1, that is, the position of the lever 33 under the stroke, at which the lever 15 is actuated. In more detail, the arm 61b of the interlocking lever 61 is shifted out of the operation range of the arm 60a of the low-speed control lever 60 by operating the low-speed control cam 66. Also, the position of the pin 52a is shifted by operating the high-speed control cam 58 constructed to operate integrally with the cam 66 and shown in FIG. 3, thereby controlling the position of the control lever 52. By so doing, the position of the cam 55a of the closing release actuating lever 55 shown in FIG. 3 relative to the pin 15a of the closing release lever 15 shown in FIG. 1 (and also shown in FIG. 3) may be changed. Considering that the lever 52 is at a position obtained by rotating it counter-clockwise from its position shown in FIG. 3, the position of the pin 15a at the instant when the closing release lever 15 shown in FIG. 1 gets out of engagement with the hook portion 12a of the closing actuating member 12 is always constant, while the position of the cam 55a is changed from its position shown in FIG. 3. Thus, the position of the arm 55b is also changed, and the position of the lever 55, at which the arm 55b is brought into engagement with the bent portion 35a, is lowered compared to the illustrated position. In other words, the bent portion 35a engages with the arm 55b and brings the pin 15a to the release position at an advanced instant.

I claim:

1. A focal plane shutter comprising a base plate member having an exposure aperture; an opening actuating member pivoted on said base plate member; opening shutter blades connected to said opening actuating member; an opening release lever pivoted on said base plate member and arranged so as to lock said opening actuating member in its cocked position; a release lock lever pivoted on said base plate member and engaged with said opening release lever, said release lock lever being rotated at the same time as the instant of shutter releasing and being capable of releasing said opening actuating member by moving said opening release lever in the final stage of rotation of said release lock lever; a gear governor engageable with said release lock lever and capable of delaying the motion of said release lock lever to delay the opening time of said opening shutter blades; an M-contact actuating lever pivoted on said base plate member; an M-movable contact pivoted on said base plate member and engaged with said M-contact actuating lever, said M-movable contact being moved after a constant time from shutter releasing, by the motion of said M-contact actuating lever which is released at the same time as the instant of shutter releasing; an M-stationary contact fixed to said base plate member and arranged to contact said M-movable contact when said M-movable contact is moved; a cam moved by the setting operation of the exposure time; and a synchro-lever pivoted on the base plate member and engageable with said cam and gear governor, whereby the moving range of said gear governor is adjusted by said cam.

* * * * *